United States Patent
Liu et al.

(10) Patent No.: US 11,720,819 B2
(45) Date of Patent: Aug. 8, 2023

(54) MACHINE LEARNING MODEL ERROR DETECTION

(71) Applicant: INTERNATIONAL BUSINESS MACHINES CORPORATION, Armonk, NY (US)

(72) Inventors: Zhe Liu, San Jose, CA (US); Yufan Guo, San Jose, CA (US); Jalal Mahmud, San Jose, CA (US); Rama Kalyani T. Akkiraju, Cupertino, CA (US)

(73) Assignee: International Business Machines, Incorporated, Armonk, NY (US)

( * ) Notice: Subject to any disclaimer, the term of this patent is extended or adjusted under 35 U.S.C. 154(b) by 379 days.

(21) Appl. No.: 16/888,356

(22) Filed: May 29, 2020

(65) Prior Publication Data
US 2021/0374601 A1 Dec. 2, 2021

(51) Int. Cl.
*G06N 20/00* (2019.01)
*G06N 5/02* (2023.01)

(52) U.S. Cl.
CPC .............. *G06N 20/00* (2019.01); *G06N 5/02* (2013.01)

(58) Field of Classification Search
CPC ..................................................... G06N 20/00
USPC .......................................................... 706/12
See application file for complete search history.

(56) References Cited

U.S. PATENT DOCUMENTS

2013/0311244 A1* 11/2013 Abotchie ......... G06Q 10/06393 705/7.39
2019/0122135 A1 4/2019 Parker
2022/0231981 A1* 7/2022 Patel ..................... G06Q 10/10

FOREIGN PATENT DOCUMENTS

| CN | 101515313 A | 8/2009 |
| CN | 109472318 A | 3/2019 |
| CN | 111008898 A | 4/2020 |

OTHER PUBLICATIONS

Adadi, A., et al., "Peeking Inside the Black-Box: A Survey on Explainable Artificial Intelligence (XAI)," IEEE Access, vol. 6, 2018, 23 pages.
Arguello, J., et al., "Classification-Based Resource Selection," CIKM '09, Nov. 2-6, 2009, Hong Kong, china, 10 pages.
Bassil, Y., et al., "OCR Post-Processing Error Correction Algorithm Using Google's Online Spelling Suggestion," Journal of Emerging Trends in Computing and Information Sciences, ISSN 2079-8407, vol. 3, No. 1, Jan. 2012, http://www.cisjournal.org/journalofcomputing/archive/vol3no1/vol3no1_7.pdf, 9 pages.
(Continued)

*Primary Examiner* — Lihong Yu
(74) *Attorney, Agent, or Firm* — Conley Rose, P.C.

(57) ABSTRACT

A system includes a memory having instructions therein and at least one processor in communication with the memory. The at least one processor is configured to execute the instructions to determine a global-level importance magnitude value for a global-level importance of an explainable feature of a machine learning base model based on a first prediction of the machine learning base model. The at least one processor is also configured to execute the instructions to determine a global-level importance direction label for the global-level importance of the explainable feature based on the first prediction. The at least one processor is also configured to execute the instructions to generate a communication for presentation to a user based on a second prediction of the machine learning base model, based on the global-level importance magnitude value, and based on the global-level importance direction label.

25 Claims, 5 Drawing Sheets

(56) References Cited

OTHER PUBLICATIONS

Chander, et al., "Working with Beliefs: AI Transparency in the Enterprise," ExSS '18, Mar. 11, Tokyo, Japan, 4 pages.

Chen, N., et al., "AnchorViz: Facilitating Classifier Error Discovery through Interactive Semantic Data Exploration," IUI 18, Mar. 7-11, 2018, Tokyo, Japan, ACM ISBN 978-1-4503-4945—Jan. 18, 2003, DOI: https://doi.org.10, 12 pages.

Crawford, K., "The Social and Economic Implications of Artificial Intelligence Technologies in the Near-Term," The AI Now Report, Version 1.0, Sep. 22, 2016, 25 pages.

Fails, J., et al., "Interactive Machine Learning," Jan. 12-15, 2003, pp. 39-45.

Fiebrink, R., "Human Model Evaluation in Interactive Supervised Learning," May 7-12, 2011, 10 pages.

Goldstein, A., "Peeking Inside the Black Box: Visualizing Statistical Learning with Plots of Individual Conditional Expectation," Mar. 21, 2014, 22 pages.

Gunning, D., "Explainable Artificial Intelligence (XAI)," DARPA/I20, 18 pages.

Harper, F., "Facts or Friends? Distinguishing Informational and Conversational Questions in Social Q&A Sites," CHI, Apr. 4-9, 2009, 10 pages.

Inkpen, K., et al., "Where is the Human? Bridging the Gap Between AI and HCI," CHI 2019 Workshop Summary, May 4-9, 2019, Glasgow, Scotland, UK, 9 pages.

Kim, Y., "Convolutional Neural Networks for Sentence Classification," Sep. 3, 2014, 6 pages.

Klein, T., "Error awareness and the insula: Links to neurological and psychiatric diseases," Review Article, Frontiers in Human Neuroscience, vol. 7, Article 14, Feb. 4, 2013, 15 pages.

Lakkaraju, H., "Interpretable & Explorable Approximations of Black Box Models," Jul. 4, 2017, 5 pages.

Liu, Z., "Seemo: A Computational Approach to See Emotions," CHI, Montreal, QC, Canda, Apr. 21-26, 2018, 12 pages.

Lundberg, S., et al., "A Unified Approach to Interpreting Model Predictions," 31st Conference on Neural Information Processing Systems, NIPS 2017, Long Beach, CA, USA, Dec. 2017, 10 pages.

Mojsilovic, A., "Factsheets for AI Services," Building Trusted AI, IBM Research, Aug. 22, 2018, 2018, 7 pages.

Molnar, C., "Interpretable Machine Learning, A Guide for Making Black Box Models Explainable" Dec. 17, 2019, 3 pages.

Nakov, P., "SemEval—2016 Task 4: Sentiment Analysis in Twitter," Proceedings of SemEval, 2016, 18 pages.

Novak, P., et al., "Sentiment of Emojis," PLoS One, Dec. 7, 2015, 22 pages.

Nushi, B., "Towards Accountable AI: Hybrid Human-Machine Analyses for Characterizing System Failure," The Sixth AAAI Conference on Human Computation and Crowdsourcing (HCOMP 2018), 2018, pp. 126-135.

Pennington, J., et al., "GloVe: Global Vectors for Word Representation," Proceedings of the 2014 Conference on Empirical Methods in Natural Language Processing (EMNLP), Oct. 25-29, 2014, pp. 1532-1543.

Ribeiro, M., et al., ""Why Should I Trust You?" Explaining the Predictions of Any Classifier," KDD, San Francisco, CA, USA, 2016, 10 pages.

Samek, W., "Explainable Artificial Intelligence: Understanding, Visualizing and Interpreting Deep Learning Models," Aug. 28, 2017, 8 pages.

Settles, B., "Active Learning Literature Survey," Computer Sciences Technical Report 1648, University of Wisconsin-Madison, Jan. 26, 2010, 67 pages.

Stymne, S., et al., "Blast: A Tool for Error Analysis of Machine Translation Output," Proceedings of the ACL-HLT, System Demonstrations, Jun. 21, 2011, pp. 56-61.

Vaswani, A., "Attention is All You Need," 31st Conference on Neural Information Processing Systems (NIPS 2017), Long Beach, CA, USA, 2017, 11 pages.

Varma, P., et al., "Flipper: A Systematic Approach to Debugging Training Sets," HILDA '17, May 14, 2017, Chicago, IL, USA; http://dx.doi.org/10.1145/3077257.3077264, 5 pages.

Malossini, A., et al., "Detecing Potential Labeling Errors in Microarrays by Data Perturbation," Original Paper, Bioinformatics, vol. 22, No. 17 2006, pp. 2114-2121; doi: 10.1093/bioinformatics/btl346; downloaded from https://academic.oup.com/bioinformatics/article-abstract/22/17/2114/273705 Oct. 21, 2019.

Zhang, C., et al., "Methods for Labeling Error Detection in Microarrays Based on the Effect of Data Perturbation on the Regression Model," Original Paper, vol. 25, No. 20, 2009, pp. 2708-2714; doi:10.1093/bioinformatics/btp478; downloaded from https: academic.oup.com/bioinformatics/article-abstract/25/20/2708/193385 Oct. 21, 2019.

Varma, P., et al., "Snuba: Automating Weak Supervision to Label Training Data," Proceedings of the VLDB, Nov. 2018, 16 pages.

Foreign Communication from a counterpart application, PCT Application PCT/IB2021/054267 filed May 18, 2021, International Search Report and Written Opinion dated Aug. 24, 2021, 9 pages.

* cited by examiner

100

Panera gives me hiccups. Positive     Panera is so good. Positive

| Feature | Contribution |
|---------|--------------|
| panera  | 0.576        |
| hiccups | -0.159       |
| gives   | 0.046        |

2(a)

| Feature | Contribution |
|---------|--------------|
| panera  | 0.153        |
| good    | 0.152        |

MACHINE LEARNING MODEL ERROR DETECTION

BACKGROUND

The present disclosure relates generally to the field of artificial intelligence and, more particularly, to improving the accuracy of a machine learning model.

Various abilities of machines to acquire and apply knowledge and skills have been categorized as artificial intelligence ("AI"). Machine learning has been considered to be a form of AI. Machine learning has employed algorithms and statistical models that have enabled computer systems to perform tasks based primarily on data patterns and associated inferences rather than explicit instructions. Some machine learning models have performed classification and/or other prediction tasks. Providing actionable insights into when and how such models have erred has been challenging.

SUMMARY

A method for correcting an erroneous prediction of a machine learning base model for a user is disclosed. The method includes determining a global-level importance magnitude value for a global-level importance of an explainable feature of the machine learning base model to the machine learning base model based on a first prediction of the machine learning base model. The method also includes determining a global-level importance direction label for the global-level importance of the explainable feature of the machine learning base model to the machine learning base model based on the first prediction of the machine learning base model. The method also includes generating a communication for presentation to the user based on a second prediction of the machine learning base model, based on the global-level importance magnitude value, and based on the global-level importance direction label.

A method for alerting a user to an erroneous prediction of a machine learning base model is also disclosed. The method includes running the machine learning base model on a first input dataset to generate a pair of baseline predictions by the machine learning base model and to determine a local-level importance of a first explainable feature of the machine learning base model to a prediction class of the machine learning base model. The method also includes receiving input data. The method also includes determining a global-level importance of the first explainable feature of the machine learning base model to the machine learning base model based on the local-level importance of the first explainable feature of the machine learning base model. The method also includes running the machine learning base model on a second input dataset to generate a new prediction by the machine learning base model. The method also includes determining an erroneousness designation for the new prediction based on the local-level importance of the first explainable feature of the machine learning base model and the global-level importance of the first explainable feature of the machine learning base model. The method also includes communicating the new prediction and an indication of the erroneousness designation for the new prediction for presentation to the user.

A system for correcting an erroneous prediction of a machine learning base model for a user is also disclosed. The system includes a memory having instructions therein and at least one processor in communication with the memory. The at least one processor is configured to execute the instructions to determine a global-level importance magnitude value for a global-level importance of an explainable feature of the machine learning base model to the machine learning base model based on a first prediction of the machine learning base model. The at least one processor is also configured to execute the instructions to determine a global-level importance direction label for the global-level importance of the explainable feature of the machine learning base model to the machine learning base model based on the first prediction of the machine learning base model. The at least one processor is also configured to execute the instructions to generate a communication for presentation to the user based on a second prediction of the machine learning base model, based on the global-level importance magnitude value, and based on the global-level importance direction label.

A system for alerting a user to an erroneous prediction of a machine learning base model is also disclosed. The system includes a memory having instructions therein and at least one processor in communication with the memory. The at least one processor is configured to execute the instructions to run the machine learning base model on a first input dataset to generate a pair of baseline predictions by the machine learning base model and to determine a local-level importance of a first explainable feature of the machine learning base model to a prediction class of the machine learning base model. The at least one processor is also configured to execute the instructions to determine a global-level importance of the first explainable feature of the machine learning base model to the machine learning base model based on the local-level importance of the first explainable feature of the machine learning base model. The at least one processor is also configured to execute the instructions to run the machine learning base model on a second input dataset to generate a new prediction by the machine learning base model. The at least one processor is also configured to execute the instructions to determine an erroneousness designation for the new prediction based on the local-level importance of the first explainable feature of the machine learning base model and the global-level importance of the first explainable feature of the machine learning base model. The at least one processor is also configured to execute the instructions to communicate the new prediction and an indication of the erroneousness designation for the new prediction for presentation to the user.

A computer program product for alerting a user to an erroneous prediction of a machine learning base model is also disclosed. The computer program product includes a computer readable storage medium having program instructions embodied therewith. The program instructions are executable by at least one processor to cause the at least one processor to run the machine learning base model on a first input dataset to generate a pair of baseline predictions by the machine learning base model and to determine a local-level importance of a first explainable feature of the machine learning base model to a prediction class of the machine learning base model. The program instructions are also executable by the at least one processor to cause the at least one processor to determine a global-level importance of the first explainable feature of the machine learning base model to the machine learning base model based on the local-level importance of the first explainable feature of the machine learning base model. The program instructions are also executable by the at least one processor to cause the at least one processor to run the machine learning base model on a second input dataset to generate a new prediction by the machine learning base model. The program instructions are also executable by the at least one processor to cause the at least one processor to determine an erroneousness designation for the new prediction based on the local-level importance of the first explainable feature of the machine learning base model and the global-level importance of the first explainable feature of the machine learning base model. The program instructions are also executable by the at least one processor to cause the at least one processor to communicate the new prediction and an indication of the erroneousness designation for the new prediction for presentation to the user.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a tabular illustration of example local-level feature contributions or importances produced by LIME analyses of a hypothetical example sentiment classification model (not shown) in accordance with aspects of the present disclosure.

Figure 2:
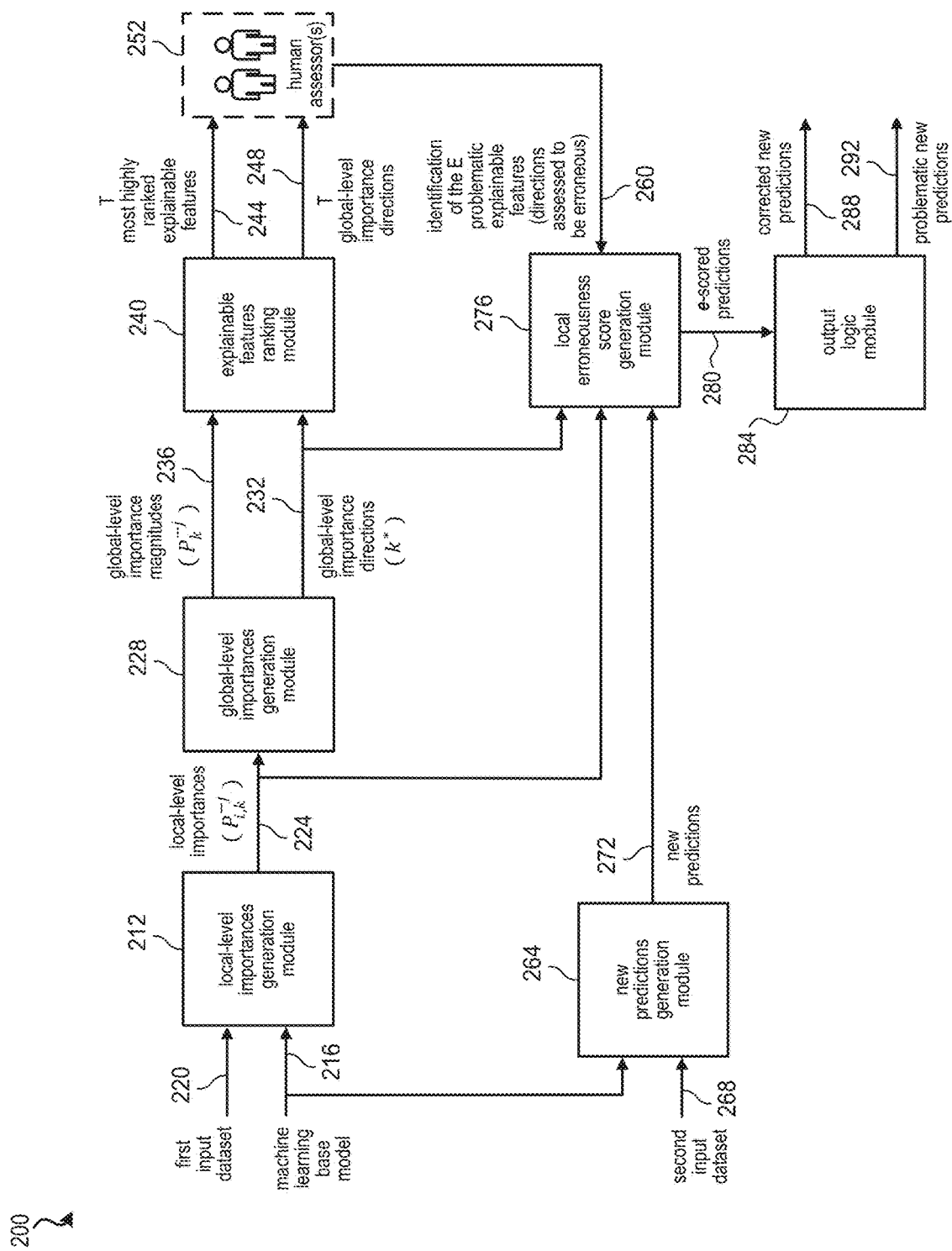
FIG. 2 is a block diagram illustration of a machine learning prediction system in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" (and inflections thereof) means to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

"Explainable feature" (and inflections thereof) as used herein means a data representation that is understandable to human beings. An intuitive explainable feature for textual data is a word (or other unigram) or a phrase, despite that the actual respective machine learning model may be built on embeddings. For images, a possible explainable feature could be a superpixel, although the respective model might be trained using pixel level features.

"Local-level explainability," "local explainability," "local-level," "local," and the like (and inflections thereof) as used herein refer to interpretations used to justify why a respective machine learning model makes a specific prediction for a single instance. In some embodiments, aspects of the present disclosure employ Local Interpretable Model-Agnostic Explanation ("LIME") techniques to make local-level explainability determinations. LIME works by perturbing explainable features of a given data input to a machine learning model and recording the corresponding changes in the model's resulting prediction probabilities. Based on the perturbed data inputs and the respective prediction outputs, LIME uses linear regression to assign relative weights to an explainable feature's importance.

FIG. 1 is a tabular illustration 100 of example local-level feature contributions or importances produced by LIME analyses of a hypothetical example sentiment classification model (not shown) in accordance with aspects of the present disclosure. In the depicted example, the model's prediction for the sentence "Panera gives me hiccups." in 2(a) is "positive." The unigram feature "panera" contributes positively to the positive prediction with a magnitude of 0.576, whereas "hiccups" contributes negatively to the positive prediction with a magnitude of 0.159. It should be appreciated that by observing the local-level feature contributions, it may be determined that the model makes a prediction error by considering the word "panera" as a significant indicator of the positive polarity, thus leading the model to assign a positive label to the negative sentence. Various embodiments of the present disclosure may employ LIME analyses to determine local-level importances of a machine learning model's explainable features. It should also be appreciated, however, that other embodiments may employ any of a number of other suitable local-level determinability techniques. Non-limiting examples of suitable alternative approaches for making local-level interpretations include Shapley Additive exPlanations ("SHAP") and Black Box Explanations through Transparent Approximations ("BETA").

The terms "global-level explainability," "global explainability," "global-level," "global," and the like (and inflections thereof) as used herein refer to how an explainable feature affects a respective machine learning model's predictions with regard to an entire or whole input dataset as opposed to its impact on a prediction made from an individual data instance of the whole dataset. In some cases, a machine learning model may have been trained on millions of data instances, whereas humans may only be capable of labeling with a much more limited number of inputs based on the local explanations. It should be appreciated that global-level explainability may allow an individual to attain a more general understanding of a machine leaning model, without knowing detailed instance level predictions and, in that sense, global explainability may help extract more distilled knowledge for less human efforts.

Aspects of the present disclosure provide a system for detecting one or more errors in a machine learning model. Given a pre-trained black-box machine learning model ("machine learning base model" or "base model") and a first input dataset, the system runs the machine learning base model on the first input dataset, using a data perturbation process, to generate baseline predictions by the machine learning base model and to determine local-level importances of explainable features of the machine learning base model to each prediction class of the machine learning base model for each of the baseline predictions. Each of the local-level importances corresponds to, for a respective prediction class of the machine learning base model, a difference between a first prediction probability, generated by the machine learning base model, from running the machine learning base model on a first input comprising that respective explainable feature and a second prediction probability, generated by the machine learning base model, from running the machine learning base model on a second input excluding that respective explainable feature. The system aggregates the local-level importances of the explainable features of the machine learning base model to determine global-level importances of the explainable features to the whole machine learning base model. Each global-level importance of the respective explainable feature comprises a magnitude value ("global-level importance magnitude value") and a direction label ("global-level importance direction label"). The global-level importance magnitude value corresponds to a relatively highest magnitude of significance of a respective explainable feature among the prediction classes of the machine learning base model, and the global-level importance direction label corresponds to the prediction class of the machine learning base model which is associated with that magnitude value. The system ranks the explainable features according to their respective global-level importance magnitude values, communicates one or more of the most highly ranked of the explainable features, and communicates the respective global-level importance direction label for each of such one or more of the most highly ranked of the explainable features (for presentation to one or more human assessors). The system receives communication of each of one or more of such most highly ranked of the explainable features that, according to a respective consensus human assessment, has an erroneous global-level importance direction. The system also receives a second input dataset. The system runs the machine learning base model on the second input dataset to generate one or more new predictions by the machine learning base model. The system calculates, as a normalized version of the accumulated error induced into each new prediction by the most highly ranked of the explainable features that, according to the respective consensus human assessments, have respective erroneous global-level importance directions, a local erroneousness score for each new prediction. The system determines a respective erroneousness designation (e.g., "problematic" or "suspected erroneousness," as opposed to "unproblematic" or "not suspected erroneousness") for each of the new predictions, based on whether the respective local erroneousness score for that new prediction exceeds a threshold value. In some embodiments, the system communicates each new prediction and an indication of the respective erroneousness designation for that new prediction (for presentation to one or more system developers or one or more other users). It should be appreciated that the one or more system developers or one or more other users may further analyze any one or more problematic new predictions, and/or analyze any associated data or other characteristics of the machine learning base model, and may revise the machine learning base model and/or take one or more other ameliorative and/or corrective actions. In some embodiments, the system communicates one or more corrected predictions (for presentation to one or more users). Each such corrected prediction is based on a respective one of the one or more new predictions and the erroneousness designation for that new prediction. More particularly, when the erroneousness designation for a new prediction is "problematic" or "suspected erroneousness," the respective corrected prediction is the inverse of that new prediction. Conversely, when the erroneousness designation for a new prediction is "unproblematic" or "not suspected erroneousness," the respective corrected prediction is the same as that new prediction.

FIG. 2 is a block diagram illustration of a machine learning prediction system 200 in accordance with aspects of the present disclosure. The machine learning prediction system 200 is configured to implement a machine learning prediction process 400 in accordance with aspects of the present disclosure (the machine learning prediction process 400 per se is not explicitly illustrated in FIG. 2, but see FIG. 4). The machine learning prediction system 200 comprises a local-level importances generation module 212. The local-level importances generation module 212 is configured to receive communication of a machine learning base model 216 and a first input dataset 220. It should be appreciated that the machine learning base model 216 may be a pre-trained classification model for tasks such as sentiment analysis, intent prediction, image classification, etc., or may be any other pre-trained machine learning model that can be treated as a black-box. It should also be appreciated that the machine learning base model 216 may comprise a logistic regression, support-vector machine ("SVM"), random forest, combinatorial neural network ("CNN"), recurrent neural network ("RNN"), and/or any other one or more types of machine learning and/or deep learning models. The local-level importances generation module 212 is also configured to run a perturbation-based LIME analysis on the local-level for all data instances of the first input dataset 220 by masking each individual explainable feature, j, one at a time, from each data instance $d_i$, $i \in \{0,1,\ldots,N\}$, which contains the explainable feature, j, and is configured to calculate the absolute changes in the prediction probabilities of the machine learning base model 216 associated with each class label $k \in \{0,1,\ldots,K\}$ of the machine learning base model 216 as:

$$P_{i,k}^{-j} = |P(y=k|d_i^{-j}) - P(y=k|d_i)|$$

where $P(y=k|d_i)$ represents the prediction probability of the machine learning base model 216 with the explainable feature, j, where $P(y=k|d_i^{-j})$ represents the prediction probability of the machine learning base model 216 without the explainable feature, j, and where $P_{i,k}^{-j}$ represents the explainable feature j's local importance associated with class k to data instance $d_i$.

The local-level importances generation module 212 is also configured to communicate the resulting set of $P_{i,k}^{-j}$ as local-level importances 224. In some embodiments, the local-level importances generation module 212 may comprise a corresponding one or more of a data processing system like the data processing system 500 (the data processing system 500 per se is not explicitly illustrated in FIG. 2, but see FIG. 5).

The machine learning prediction system 200 also comprises a global-level importances generation module 228. The global-level importances generation module 228 is communicatively coupled to the local-level importances generation module 212. The global-level importances generation module 228 is configured to receive communication of the local-level importances 224. The global-level importances generation module 228 is also configured to, for all N data instances, $d_i$, containing each explainable feature, j, aggregate the local-level importance of the explainable feature, j, to all N data instances, $d_i$, to a global level, by calculating:

$$k^* = \operatorname*{argmax}_{k} \frac{1}{N} \sum_{i=1}^{N} P_{i,k}^{-j},$$

where k* denotes the class label with the maximum average probability change and represents the direction of the explainable feature j's global-level importance, and where $P_{i,k}^{-j}$ represents the explainable feature j's local importance associated with each class k to each data instance $d_i$. The global-level importances generation module 228 is also configured to calculate an associated magnitude of each explainable feature j's global-level importance, as:

$$P_k^{-j} = \frac{1}{N} \sum_{i=1}^{N} P_{k^*}^{-j},$$

where the associated $P_k^{-j}$ represents the global-level importance magnitude.

Figure 3:
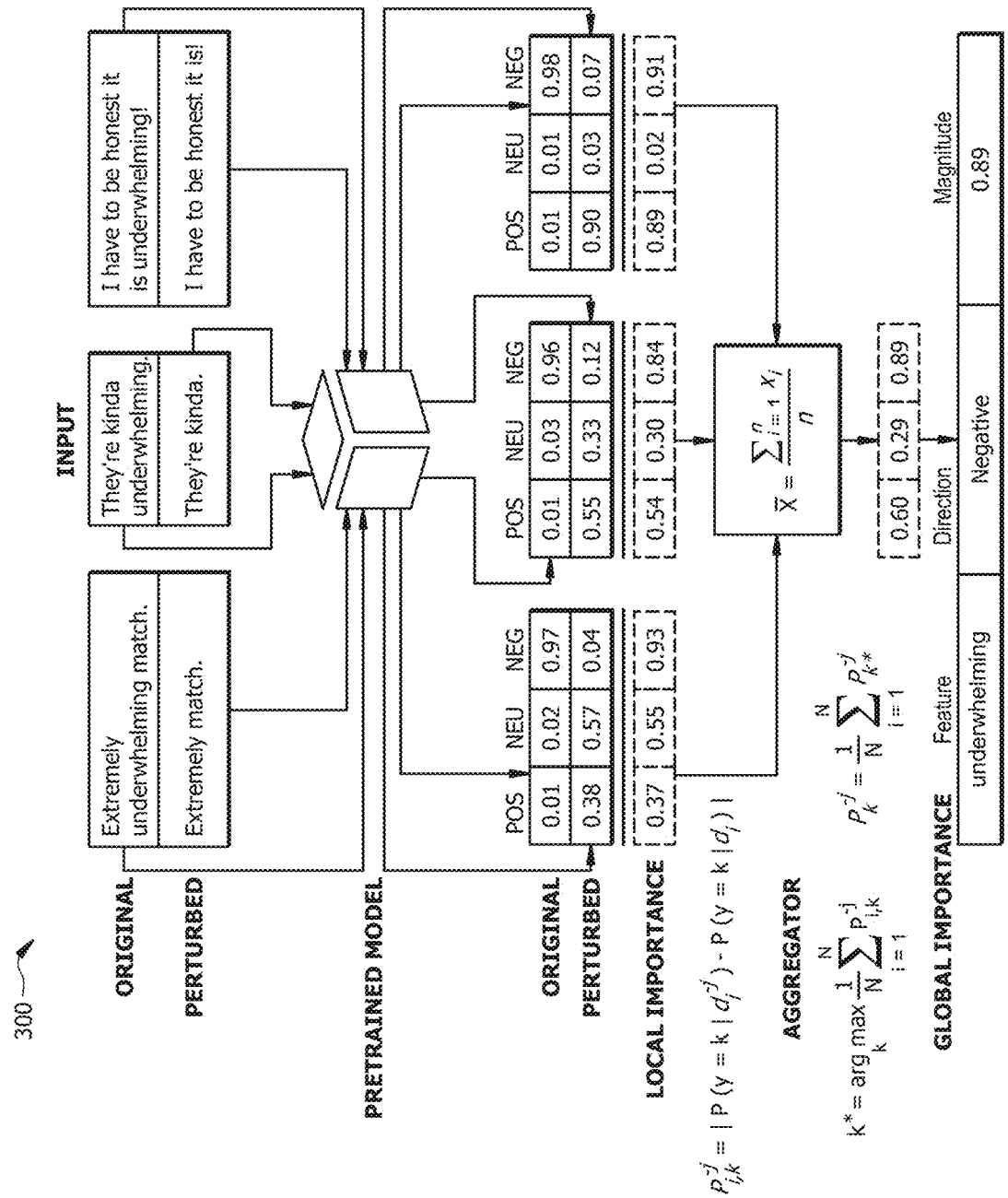
FIG. 3 is a data flow diagram illustration of how, in some instances, a global-level importance magnitude and direction may be calculated for a unigram explainable feature such as, for example, "underwhelming," in accordance with aspects of the present disclosure.

FIG. 3 is a data flow diagram illustration 300 of how, in some instances, a global-level importance magnitude and direction may be calculated for a unigram explainable feature, for example, "underwhelming," in accordance with aspects of the present disclosure. It should be appreciated that global-level importance measurements can be viewed as an aggregation of the local-level importances, with the underlying assumption being that a feature is more or less important if removing it can change the prediction probability more or less significantly.

Referring again to FIG. 2, the global-level importances generation module 228 is also configured to communicate the resulting set of the k* as respective global-level importance directions 232 and to communicate the resulting set of the associated $P_k^{-j}$ as respective global-level importance magnitudes 236. In some embodiments, the global-level importances generation module 228 may comprise a corresponding one or more of a data processing system like the data processing system 500 (the data processing system 500 per se is not explicitly illustrated in FIG. 2, but see FIG. 5).

The machine learning prediction system 200 also comprises an explainable features ranking module 240. The explainable features ranking module 240 is communicatively coupled to the global-level importances generation module 228. The explainable features ranking module 240 is configured to receive communication of the global-level importance directions 232 and the global-level importance magnitudes 236. The explainable features ranking module 240 is also configured to rank the explainable features, j, in descending order according to their respective global-level importance magnitudes 236. The explainable features ranking module 240 is also configured to communicate a number, T, of one or more of the such most highly ranked of the explainable features, j, along with their respective global-level importance directions 232, as T most highly ranked explainable features 244 and T global-level importance directions 248, respectively, for ultimate presentation to one or more human assessors 252. In some embodiments, the explainable features ranking module 240 may comprise a corresponding one or more of a data processing system like the data processing system 500 (the data processing system 500 per se is not explicitly illustrated in FIG. 2, but see FIG. 5).

The human assessors 252 may comprise experts, online crowd workers, and/or anyone else who can identify those of the T most highly ranked explainable features 244 for which any one or more of the respective ones of the T global-level importance directions 248 are not what the human assessors 252 think they should be. For example, such an evaluation task may comprise the human assessors 252 making a yes or no judgment for each of the T most highly ranked explainable features 244 and each of the respective T global-level importance directions 248 (e.g., positive or negative in the case of a sentiment analysis task), where the human assessors 252 are asked whether or not each respective one of the T global-level importance directions 248 seems correct. An example task question might be "Is the word 'panera' of 'positive' sentiment polarity?," where the assessors are expected to choose "no" as the answer. Among the T most highly ranked explainable features 244, a consensus of the human assessors 252 may determine a number, E, of one or more of them to have respective ones of the T global-level importance directions 248 that are problematic or incorrect (i.e., not what the consensus of the human assessors 252 think they should be). A corresponding identification of the E problematic explainable features 260 may be used by the machine learning prediction system 200 as described further below.

The machine learning prediction system 200 also comprises a new predictions generation module 264. The new predictions generation module 264 is configured to receive communication of the machine learning base model 216 and a second input dataset 268. The new predictions generation module 264 is also configured to run the machine learning base model 216 on the second input dataset 268 to generate new predictions 272 by the machine learning base model 216 based on the second input dataset 268. The new predictions generation module 264 is also configured to communicate the new predictions 272. In some embodiments, the new predictions generation module 264 may comprise a corresponding one or more of a data processing system like the data processing system 500 (the data processing system 500 per se is not explicitly illustrated in FIG. 2, but see FIG. 5).

The machine learning prediction system 200 also comprises a local erroneousness score generation module 276. The local erroneousness score generation module 276 is communicatively coupled to the local-level importances generation module 212, the global-level importances generation module 228, and the new predictions generation module 264. The local erroneousness score generation module 276 is configured to receive communication of the local-level importances 224, to receive communication of the global-level importance directions 232, to receive communication of the new predictions 272, and to receive communication of the identification of the E problematic explainable features 260. It should be appreciated that even though the T most highly ranked explainable features 244 may help to identify problematic predictions on the unlabeled instances, in some instances flagging error occurrences on individual instance levels only based on the problematic explainable features identified by the identification of the E problematic explainable features 260 could, at times, be somewhat unreliable. For example, as illustrated in FIG. 1, noticing "panera" being incorrectly learned as "positive" could help accurately identify the wrong prediction of sentence 2(a); however, its erroneous impact on sentence 2(b) is disguised by the existence of the other positive feature "good," which may be learned correctly on the global level. Referring again to FIG. 2, to more accurately determine problematic predictions, the local erroneousness score generation module 276 is also configured to calculate a measurement metric called the local erroneousness score, e, to account for the relative impact of the global erroneous features on the local level. More particularly, the local erroneousness score generation module 276 is configured to calculate a local erroneousness score, e, for each of the new predictions 272, as a normalized version of the accumulated error contributions induced into each of the new predictions 272 by the problematic explainable features identified by the identification of the E problematic explainable features 260, as follows:

$$e = \frac{\sum_{j=1}^{m} c_j^*}{\sum_{i=1}^{n} c_i^+},$$

where $c_j^* \in [-1,1]$ represents the local contribution of the erroneous explainable feature, j, on the specific instance, where m indicates the total number of erroneous features identified from the global perspective, where $c_i^+ \in (0,1]$ represents the local contribution of the explainable feature, i, whose global-level importance direction is the same as the respective one of the new predictions 272, and where n represents the total number of positively contributed explainable features. For example, referring to FIG. 1, one can see that sentence 2(a) derives a much higher local erroneous score (0.926) than the sentence 2(b) score (0.502). It should be appreciated that each local erroneous score, e, will have a value between $-\infty$ to 1.

Referring again to FIG. 2, the local erroneousness score generation module 276 is also configured to associate each of the local erroneousness scores, e, with the respective one of the new predictions 272, and to communicate the resulting set as e-scored predictions 280. In some embodiments, the local erroneousness score generation module 276 may comprise a corresponding one or more of a data processing system like the data processing system 500 (the data processing system 500 per se is not explicitly illustrated in FIG. 2, but see FIG. 5).

The machine learning prediction system 200 also comprises an output logic module 284. The output logic module 284 is communicatively coupled to the local erroneousness score generation module 276. The output logic module 284 is configured to receive communication of the e-scored predictions 280. The output logic module 284 is also configured to determine a respective erroneousness designation for each of the e-scored predictions 280 (and, thus, also for each of the associated new predictions 272), based on whether the respective local erroneousness score, e, for that one of the e-scored predictions 280 exceeds a predefined threshold value, τ. For example, in some embodiments, the output logic module 284 is configured to designate each of the e-scored predictions 280 (and, thus, each of the associated new predictions 272) that has a local erroneousness score, e, that exceeds the predefined threshold value, τ, as "problematic" or as a "problematic new prediction." The output logic module 284 is also configured to automatically generate a respective one of corrected new predictions 288 for each of the respective e-scored predictions 280 based on whether that one of the respective e-scored predictions 280 exceeds the predefined threshold value, τ. For example, when a particular one of the e-scored predictions 280 is "no" or "negative" and the local erroneousness score, e, for that one of the e-scored predictions 280 exceeds the predefined threshold value, τ, the output logic module 284 may automatically generate a "yes" or "positive" prediction as the corresponding one of the corrected new predictions 288. Conversely, when a particular one of the e-scored predictions 280 is "yes" or "positive" and the local erroneousness score, e, for that one of the e-scored predictions 280 exceeds the predefined threshold value, τ, the output logic module 284 may automatically generate a "no" or "negative" prediction as the corresponding one of the corrected new predictions 288. The output logic module 284 is configured to, for each of the corrected new predictions 288 for which the respective one of the e-scored predictions 280 does not exceed the predefined threshold value, τ, make that one of the corrected new predictions 288 the same as the respective one of the new predictions 272.

The output logic module 284 is also configured to communicate the corrected new predictions 288. The output logic module 284 is also configured to communicate whichever of the e-scored predictions 280 (and, thus, whichever of the associated new predictions 272) that have a respective local erroneousness score, e, that exceeds the predefined threshold value, τ, as a corresponding set of one or more respective problematic new predictions 292. In some embodiments, the output logic module 284 may comprise a corresponding one or more of a data processing system like the data processing system 500 (the data processing system 500 per se is not explicitly illustrated in FIG. 2, but see FIG. 5).

Figure 4:
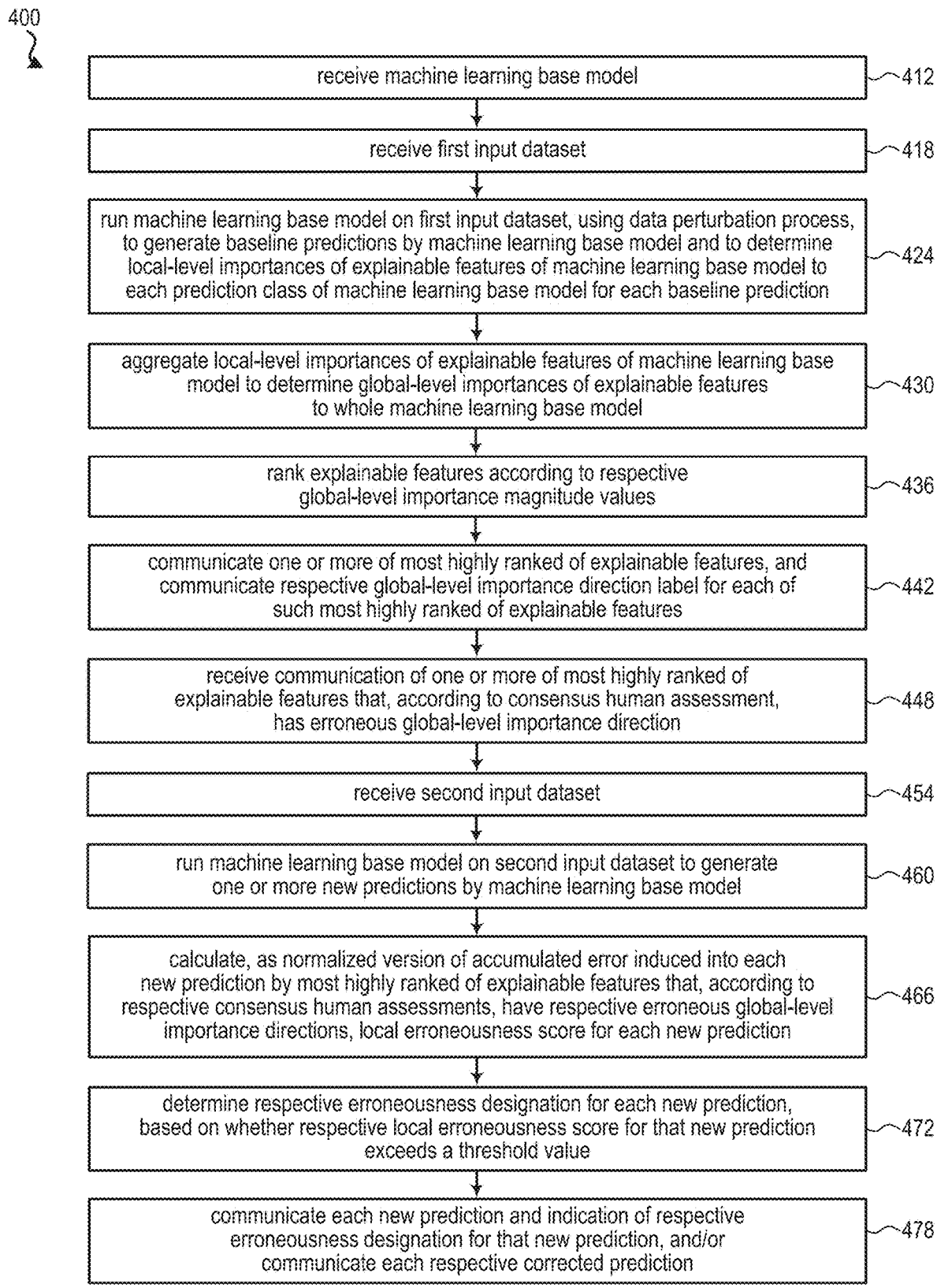
FIG. 4 is a flowchart illustration of a machine learning prediction process in accordance with aspects of the present disclosure.

FIG. 4 is a flowchart illustration of the machine learning prediction process 400 in accordance with aspects of the present disclosure. In some instances, one or more steps of the machine learning prediction process 400 may be performed by one or more components of the machine learning prediction system 200 and/or one or more of the other systems, components, methods, and/or processes described herein. For clarity of exposition, the following description(s) of the machine learning prediction process 400 may refer to one or more of such systems, components, methods, and/or processes. Nevertheless, it should be appreciated that the machine learning prediction process 400 and/or any one or more of its particular steps may be performed by any suitable system(s), component(s), method(s), and/or process(es). It should also be appreciated that the machine learning prediction process 400 may be performed concurrently or substantially concurrently with any other method(s) and/or process(es) described herein.

At step 412, the machine learning prediction process 400 receives a machine learning base model. Accordingly, in some instances, the local-level importances generation module 212 and/or the new predictions generation module 264 may receive communication of the machine learning base model 216. From step 412, the machine learning prediction process 400 goes to (and continues at) step 418.

At step 418, the machine learning prediction process 400 receives a first input dataset. Accordingly, in some instances, the local-level importances generation module 212 may receive communication of the first input dataset 220. From step 418, the machine learning prediction process 400 goes to (and continues at) step 424.

At step 424, the machine learning prediction process 400 runs the machine learning base model on the first input dataset, using a data perturbation process, to generate baseline predictions by the machine learning base model and to determine local-level importances of the explainable features of the machine learning base model to each prediction class of the machine learning base model for each baseline prediction. Accordingly, in some instances, the local-level importances generation module 212 may run the machine learning base model 216 on the first input dataset 220, using LIME data perturbation techniques, to determine the local-level importances 224. From step 424, the machine learning prediction process 400 goes to (and continues at) step 430.

At step 430, the machine learning prediction process 400 aggregates the local-level importances of the explainable features of the machine learning base model to determine global-level importances of the explainable features to the whole machine learning base model. Accordingly, in some instances, the global-level importances generation module 228 may use the local-level importances 224 to determine the global-level importance directions 232 and the global-level importance magnitudes 236. From step 430, the machine learning prediction process 400 goes to (and continues at) step 436.

At step 436, the machine learning prediction process 400 ranks the explainable features according to their respective global-level importance magnitude values. Accordingly, in some instances, the explainable features ranking module 240 may rank the explainable features, j, in descending order according to the respective global-level importance magnitudes 236. From step 436, the machine learning prediction process 400 goes to (and continues at) step 442.

At step 442, the machine learning prediction process 400 communicates one or more of the most highly ranked of the explainable features, and communicates a respective global-level importance direction label for each of such most highly ranked of the explainable features. Accordingly, in some instances, the explainable features ranking module 240 may communicate one or more of the such most highly ranked of the explainable features, j, along with their respective global-level importance directions 232, as the T most highly ranked explainable features 244 and the T global-level importance directions 248, respectively, for ultimate presentation to one or more human assessors 252. From step 442, the machine learning prediction process 400 goes to (and continues at) step 448.

At step 448, the machine learning prediction process 400 receives communication of each of one or more of the most highly ranked of the explainable features that, according to one or more consensus human assessments, has an erroneous global-level importance direction. Accordingly, in some instances, the local erroneousness score generation module 276 may receive communication of the identification of the E problematic explainable features 260. From step 448, the machine learning prediction process 400 goes to (and continues at) step 454.

At step 454, the machine learning prediction process 400 receives a second input dataset. Accordingly, in some instances, the new predictions generation module 264 may receive communication of the second input dataset 268. From step 454, the machine learning prediction process 400 goes to (and continues at) step 460.

At step 460, the machine learning prediction process 400 runs the machine learning base model on the second input dataset to generate one or more new predictions by the machine learning base model. Accordingly, in some instances, the new predictions generation module 264 may run the machine learning base model 216 on the second input dataset 268 to generate the new predictions 272. From step 460, the machine learning prediction process 400 goes to (and continues at) step 466.

At step 466, the machine learning prediction process 400 calculates, as normalized version of the accumulated error induced into each new prediction by the most highly ranked of the explainable features that, according to the respective consensus human assessments, have respective erroneous global-level importance directions, a local erroneousness score for each of the new predictions of the machine learning base model. Accordingly, in some instances, the local erroneousness score generation module 276 may calculate the local erroneousness score, e, for each of the new predictions 272, as the normalized version of the accumulated error contributions induced into each of the new predictions 272 by the problematic explainable features identified by the identification of the E problematic explainable features 260. From step 466, the machine learning prediction process 400 goes to (and continues at) step 472.

At step 472, the machine learning prediction process 400 determines a respective erroneousness designation for each of the new predictions of the machine learning base model, based on whether the respective local erroneousness score for that new prediction exceeds a threshold value. Accordingly, in some instances, the output logic module 284 may determine the respective erroneousness designation for each of the e-scored predictions 280 (and, thus, also for each of the associated new predictions 272), based on whether the respective local erroneousness score, e, for that one of the e-scored predictions 280 exceeds the predefined threshold value, $\tau$. From step 472, the machine learning prediction process 400 goes to (and continues at) step 478.

At step 478, the machine learning prediction process 400 communicates each of the new predictions of the machine learning base model and an indication of the respective erroneousness designation for that new prediction, and/or communicates each respective corrected prediction. Accordingly, in some instances, the output logic module 284 may communicate the corrected new predictions 288 and/or communicate one or more respective problematic new predictions 292.

Figure 5:
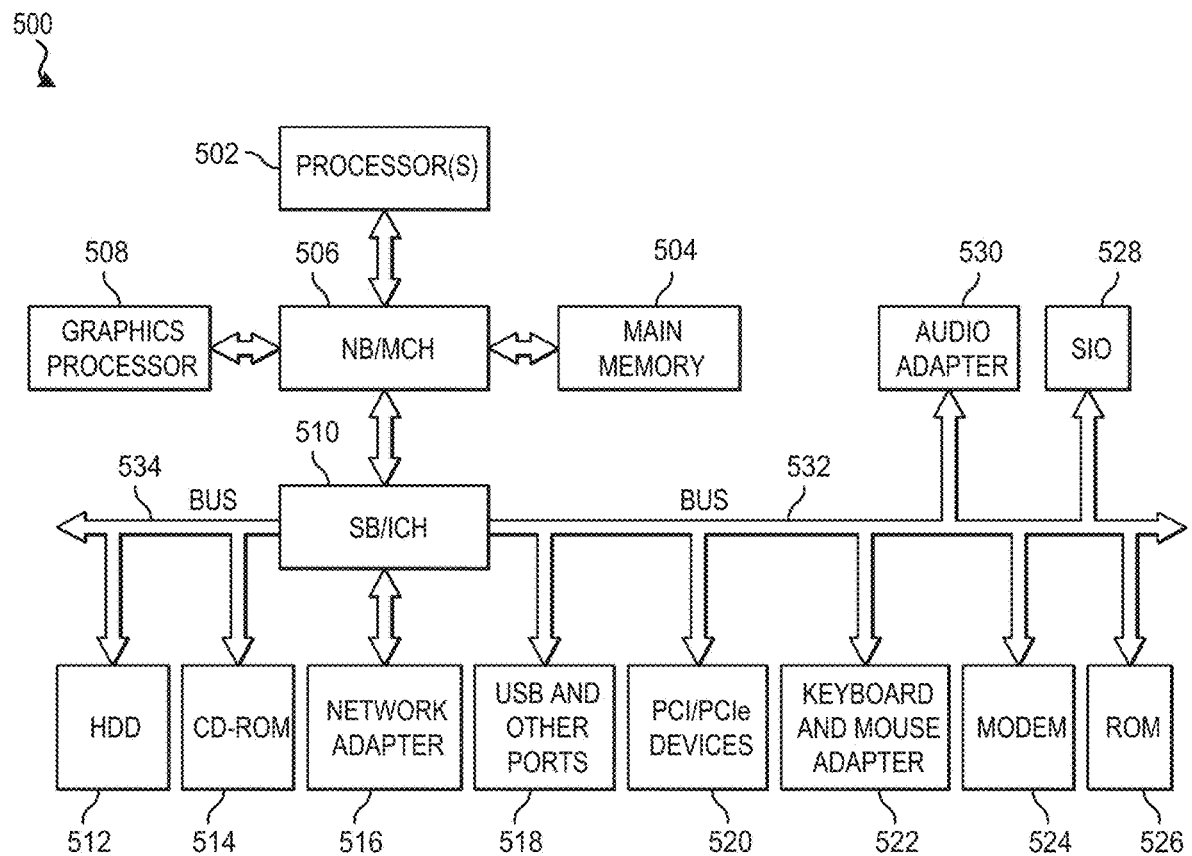
FIG. 5 is a block diagram illustration of a hardware architecture of a data processing system in accordance with aspects of the present disclosure.

FIG. 5 is a block diagram illustration of a hardware architecture of a data processing system 500 in accordance with aspects of the present disclosure. In some embodiments, one or more of the systems and/or components described herein (e.g., the machine learning prediction system 200 and/or one or more components thereof) may be implemented using a corresponding one or more of the data processing system 500. Moreover, the data processing system 500 may be configured to store and execute one or more instructions for performing on ore more steps of the machine learning prediction process 400 and/or for performing one or more steps of any other methods and/or processes described herein.

The data processing system 500 employs a hub architecture including north bridge and memory controller hub ("NB/MCH") 506 and south bridge and input/output ("I/O") controller hub ("SB/ICH") 510. Processor(s) 502, main memory 504, and graphics processor 508 are connected to NB/MCH 506. Graphics processor 508 may be connected to NB/MCH 506 through an accelerated graphics port ("AGP"). A computer bus, such as bus 532 or bus 534, may be implemented using any type of communication fabric or architecture that provides for a transfer of data between different components or devices attached to the fabric or architecture.

Network adapter 516 connects to SB/ICH 510. Audio adapter 530, keyboard and mouse adapter 522, modem 524, read-only memory ("ROM") 526, hard disk drive ("HDD") 512, compact disk read-only memory ("CD-ROM") drive 514, universal serial bus ("USB") ports and other communication ports 518, and peripheral component interconnect/peripheral component interconnect express ("PCI/PCIe") devices 520 connect to SB/ICH 510 through bus 532 and bus 534. PCI/PCIe devices may include, for example, Ethernet adapters, add-in cards, and personal computing ("PC") cards for notebook computers. PCI uses a card bus controller, while PCIe does not. ROM 526 may comprise, for example, a flash basic input/output system ("BIOS"). Modem 524 or network adapter 516 may be used to transmit and receive data over a network.

HDD 512 and CD-ROM drive 514 connect to SB/ICH 510 through bus 534. HDD 512 and CD-ROM drive 514 may use, for example, an integrated drive electronics ("IDE") or serial advanced technology attachment ("SATA") interface. In some embodiments, the HDD 512 may be replaced by other forms of data storage devices including, but not limited to, solid-state drives ("SSDs"). A super I/O ("SIO") device 528 may be connected to SB/ICH 510. SIO device 528 may comprise a chip on the motherboard that is configured to assist in performing less demanding controller functions for the SB/ICH 510 such as controlling a printer port, controlling a fan, and/or controlling the small light emitting diodes ("LEDS") of the data processing system 500.

The data processing system 500 may include a single processor 502 or may include a plurality of processors 502. Additionally, processor(s) 502 may have multiple cores. In some embodiments, data processing system 500 may employ a large number of processors 502 that include hundreds or thousands of processor cores. In some embodiments, the processors 502 may be configured to perform a set of coordinated computations in parallel.

An operating system is executed on the data processing system 500 using the processor(s) 502. The operating system coordinates and provides control of various components within the data processing system 500. Various applications and services may run in conjunction with the operating system. Instructions for the operating system, applications, and other data are located on storage devices, such as one or more of the HDD 512, and may be loaded into main memory 504 for execution by processor(s) 502. In some embodiments, additional instructions or data may be stored on one or more external devices. The processes described herein for the illustrative embodiments may be performed by processor(s) 502 using computer usable program code, which may be located in a memory such as, for example, main memory 504, ROM 526, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for alerting a user to an erroneous prediction of a machine learning base model, the method comprising:
   running the machine learning base model on a first input dataset to generate a pair of baseline predictions by the machine learning base model and to determine a local-level importance of a first explainable feature of the machine learning base model to a prediction class of the machine learning base model;
   determining a global-level importance of the first explainable feature of the machine learning base model to the machine learning base model based on the local-level importance of the first explainable feature of the machine learning base model;
   running the machine learning base model on a second input dataset to generate a new prediction by the machine learning base model;
   determining an erroneousness designation for the new prediction based on the local-level importance of the first explainable feature of the machine learning base model and the global-level importance of the first explainable feature of the machine learning base model; and
   communicating the new prediction and an indication of the erroneousness designation for the new prediction for presentation to the user.

2. The method of claim 1, further comprising:
   determining a rank of the first explainable feature of the machine learning base model relative to a second explainable feature of the machine learning base model, based on a global-level importance magnitude value;
   communicating the first explainable feature of the machine learning base model based on the rank of the first explainable feature of the machine learning base model;
   communicating a global-level importance direction label;
   receiving communication of the first explainable feature of the machine learning base model; and calculating, as a normalized version of error induced into the new prediction by the first explainable feature of the machine learning base model, a local erroneousness score for the new prediction, wherein the global-level importance of the first explainable feature of the machine learning base model comprises the global-level importance magnitude value and the global-level importance direction label, wherein, according to a human assessment, the global-level importance direction label is erroneous, and wherein determining the erroneousness designation for the new prediction comprises determining the erroneousness designation for each new prediction based on whether the local erroneousness score for the new prediction exceeds a threshold value.

3. The method of claim 2, wherein running the machine learning base model on the first input dataset to generate the pair of baseline predictions by the machine learning base model and to determine the local-level importance of the first explainable feature of the machine learning base model to the prediction class of the machine learning base model comprises using a data perturbation process to generate the pair of baseline predictions by the machine learning base model and to determine the local-level importance of the first explainable feature of the machine learning base model to the prediction class of the machine learning base model.

4. The method of claim 3, wherein using the data perturbation process to generate the pair of baseline predictions by the machine learning base model and to determine the local-level importance of the first explainable feature of the machine learning base model to the prediction class of the machine learning base model comprises calculating $$P_{i,k}^{-j} = |P(y=k|d_i^{-j}) - P(y=k|d_i)|,$$

wherein j represents the first explainable feature, wherein $d_i$, $i \in \{0,1, \ldots, N\}$, represents a first data instance in the first input dataset, wherein $d_i$ comprises the first explainable feature, j, wherein $d_i^{-j}$ represents all of the first data instance, $d_i$, except for the first explainable feature, j, wherein $k \in \{0,1, \ldots, K\}$ represents a corresponding prediction class of the machine learning base model, wherein $P(y=k|d_i)$ represents a first prediction probability generated by the machine learning base model, from running the machine learning base model on the first data instance, $d_i$, for the corresponding prediction class, k, of the machine learning base model, wherein $P(y=k|d_i^{-j})$ represents a second prediction probability generated by the machine learning base model, from running the machine learning base model on $d_i^{-j}$, for the corresponding prediction class, k, of the machine learning base model, and wherein $P_{i,k}^{-j}$ represents the local-level importance of the first explainable feature, j, associated with the corresponding prediction class, k, to the first data instance, $d_i$.

5. The method of claim 4, wherein determining the global-level importance of the first explainable feature of the machine learning base model to the machine learning base model based on the local-level importance of the first explainable feature of the machine learning base model comprises calculating $$k^* = \arg\max_k \frac{1}{N} \sum_{i=1}^{N} P_{i,k}^{-j},$$

wherein N represents a cardinality of a set of data instances in the first input dataset, wherein each data instance in the set of data instances comprises the first explainable feature, and wherein k* represents the global-level importance direction label of the global-level importance of the first explainable feature.

6. The method of claim 5, wherein determining the global-level importance of the first explainable feature of the machine learning base model to the machine learning base model based on the local-level importance of the first explainable feature of the machine learning base model comprises calculating $$P_k^{-j} = \frac{1}{N} \sum_{i=1}^{N} P_{k^*}^{-j},$$

wherein $P_k^{-j*}$ represents a magnitude of a third prediction probability generated by the machine learning base model and associated with the global-level importance direction label of the global-level importance of the first explainable feature, and wherein $P_k^{-j}$ represents the global-level importance magnitude value of the global-level importance of the first explainable feature.

7. The method of claim 6, wherein calculating the local erroneousness score for the new prediction comprises calculating $$e = \frac{\sum_{j=1}^{m} c_j^*}{\sum_{i=1}^{n} c_i^+},$$

wherein $c_j^* \in [-1,1]$ represents a contribution of a first respective explainable feature, j, to a prediction probability generated by the machine learning base model from running the machine learning base model on a second data instance in the second input dataset, wherein, according to the human assessment, each global-level importance direction label in a set of global-level importance direction labels is erroneous, wherein m represents a cardinality of the set of global-level importance direction labels, wherein $c_i^+ \in (0,1]$ represents a contribution of a second respective explainable feature, i, to the prediction probability generated by the machine learning base model from running the machine learning base model on the second data instance in the second input dataset, wherein a contribution direction of the second respective explainable feature, i, is consistent with the new prediction, wherein n represents a cardinality of a set of explainable features, and wherein a contribution direction of each explainable feature in the set of explainable features is consistent with the new prediction.

8. The method of claim 1, further comprising determining a global-level importance magnitude value and a global-level importance direction label for the global-level importance of the explainable feature of the machine learning base model to the machine learning base model.

9. The method of claim 8, further comprising receiving an erroneousness assessment of the global-level importance direction label.

10. The method of claim 9, further comprising correcting the erroneous prediction based on the global-level importance direction label, based on the erroneousness assessment of the global-level importance direction label, and based on the local-level importance of the explainable feature of the machine learning base model to the prediction class of the machine learning base model.

11. The method of claim 9, wherein receiving the erroneousness assessment of the global-level importance direction label comprises receiving a human erroneousness assessment of the global-level importance direction label.

12. A system for alerting a user to an erroneous prediction of a machine learning base model, the system comprising:
a memory having instructions therein; and
at least one processor in communication with the memory, wherein the at least one processor is configured to execute the instructions to:
run the machine learning base model on a first input dataset to generate a pair of baseline predictions by the machine learning base model and to determine a local-level importance of a first explainable feature of the machine learning base model to a prediction class of the machine learning base model;
determine a global-level importance of the first explainable feature of the machine learning base model to the machine learning base model based on the local-level importance of the first explainable feature of the machine learning base model;
run the machine learning base model on a second input dataset to generate a new prediction by the machine learning base model;
determine an erroneousness designation for the new prediction based on the local-level importance of the first explainable feature of the machine learning base model and the global-level importance of the first explainable feature of the machine learning base model; and
communicate the new prediction and an indication of the erroneousness designation for the new prediction for presentation to the user.

13. The system of claim 12, wherein the at least one processor is further configured to execute the instructions to:
determine a rank of the first explainable feature of the machine learning base model relative to a second explainable feature of the machine learning base model, based on a global-level importance magnitude value;
communicate the first explainable feature of the machine learning base model based on the rank of the first explainable feature of the machine learning base model;
communicate a global-level importance direction label;
receive communication of the first explainable feature of the machine learning base model;
calculate, as a normalized version of error induced into the new prediction by the first explainable feature of the machine learning base model, a local erroneousness score for the new prediction; and
determine the erroneousness designation for each new prediction based on whether the local erroneousness score for the new prediction exceeds a threshold value, wherein the global-level importance of the first explainable feature of the machine learning base model comprises the global-level importance magnitude value and the global-level importance direction label, and
wherein the global-level importance direction label has been identified as erroneous.

14. The system of claim 13, wherein the at least one processor is further configured to execute the instructions to use a data perturbation process to generate the pair of baseline predictions by the machine learning base model and to determine the local-level importance of the first explainable feature of the machine learning base model to the prediction class of the machine learning base model.

15. The system of claim 14, wherein the at least one processor is further configured to execute the instructions to calculate:

$$P_{i,k}^{-j} = |P(y=k|d_i^{-j}) - P(y=k|d_i)|,$$

wherein j represents the first explainable feature,
wherein $d_i$, $i \in \{0,1, \ldots, N\}$, represents a first data instance in the first input dataset,
wherein $d_i$ comprises the first explainable feature, j,
wherein $d_i^{-j}$ represents all of the first data instance, $d_i$, except for the first explainable feature, j,
wherein $k \in \{0,1, \ldots, K\}$ represents a corresponding prediction class of the machine learning base model,
wherein $P(y=k|d_i)$ represents a first prediction probability generated by the machine learning base model, from running the machine learning base model on the first data instance, $d_i$, for the corresponding prediction class, k, of the machine learning base model,
wherein $P(y=k|d_i^{-j})$ represents a second prediction probability generated by the machine learning base model, from running the machine learning base model on $d_i^{-j}$, for the corresponding prediction class, k, of the machine learning base model, and
wherein $P_{i,k}^{-j}$ represents the local-level importance of the first explainable feature, j, associated with the corresponding prediction class, k, to the first data instance, $d_i$.

16. The system of claim 15, wherein the at least one processor is further configured to execute the instructions to calculate:

$$k^* = \arg\max_k \frac{1}{N} \sum_{i=1}^{N} P_{i,k}^{-j},$$

wherein N represents a cardinality of a set of data instances in the first input dataset,
wherein each data instance in the set of data instances comprises the first explainable feature, and
wherein k* represents the global-level importance direction label of the global-level importance of the first explainable feature.

17. The system of claim 16, wherein the at least one processor is further configured to execute the instructions to calculate:

$$P_k^{-j} = \frac{1}{N} \sum_{i=1}^{N} P_{k^*}^{-j},$$

wherein $P_{k^*}^{-j}$ represents a magnitude of a third prediction probability generated by the machine learning base model and associated with the global-level importance direction label of the global-level importance of the first explainable feature, and wherein $P_k^{-j}$ represents the global-level importance magnitude value of the global-level importance of the first explainable feature.

18. The system of claim 17, wherein the at least one processor is further configured to execute the instructions to calculate:

$$e = \frac{\sum_{j=1}^{m} c_j^*}{\sum_{i=1}^{n} c_i^+},$$

wherein $c_j^* \in [-1,1]$ represents a contribution of a first respective explainable feature, j, to a prediction probability generated by the machine learning base model from running the machine learning base model on a second data instance in the second input dataset, wherein, according to a human assessment, each global-level importance direction label in a set of global-level importance direction labels is erroneous, wherein m represents a cardinality of the set of global-level importance direction labels, wherein $c_i^+ \in (0,1]$ represents a contribution of a second respective explainable feature, i, to the prediction probability generated by the machine learning base model from running the machine learning base model on the second data instance in the second input dataset, wherein a contribution direction of the second respective explainable feature, i, is consistent with the new prediction, wherein n represents a cardinality of a set of explainable features, and wherein a contribution direction of each explainable feature in the set of explainable features is consistent with the new prediction.

19. The system of claim 12, wherein the processor is further configured to determine a global-level importance magnitude value and a global-level importance direction label for the global-level importance of the explainable feature of the machine learning base model to the machine learning base model.

20. The system of claim 19, wherein the processor is further configured to receive an erroneousness assessment of the global-level importance direction label.

21. The system of claim 20, wherein the processor is further configured to correct the erroneous prediction based on the global-level importance direction label, based on the erroneousness assessment of the global-level importance direction label, and based on the local-level importance of the explainable feature of the machine learning base model to the prediction class of the machine learning base model.

22. The system of claim 20, wherein receiving the erroneousness assessment of the global-level importance direction label comprises receiving a human erroneousness assessment of the global-level importance direction label.

23. A computer program product for alerting a user to an erroneous prediction of a machine learning base model, the computer program product comprising a computer readable storage medium having program instructions embodied therewith, the program instructions executable by at least one processor to cause the at least one processor to:
run the machine learning base model on a first input dataset to generate a pair of baseline predictions by the machine learning base model and to determine a local-level importance of a first explainable feature of the machine learning base model to a prediction class of the machine learning base model;
determine a global-level importance of the first explainable feature of the machine learning base model to the machine learning base model based on the local-level importance of the first explainable feature of the machine learning base model;
run the machine learning base model on a second input dataset to generate a new prediction by the machine learning base model;
determine an erroneousness designation for the new prediction based on the local-level importance of the first explainable feature of the machine learning base model and the global-level importance of the first explainable feature of the machine learning base model; and
communicate the new prediction and an indication of the erroneousness designation for the new prediction for presentation to the user.

24. The computer program product of claim 23, wherein the program instructions are further executable by the at least one processor to cause the at least one processor to:
determine a rank of the first explainable feature of the machine learning base model relative to a second explainable feature of the machine learning base model, based on a global-level importance magnitude value;
communicate the first explainable feature of the machine learning base model based on the rank of the first explainable feature of the machine learning base model;
communicate a global-level importance direction label;
receive communication of the first explainable feature of the machine learning base model;
calculate, as a normalized version of error induced into the new prediction by the first explainable feature of the machine learning base model, a local erroneousness score for the new prediction; and
determine the erroneousness designation for each new prediction based on whether the local erroneousness score for the new prediction exceeds a threshold value,
wherein the global-level importance of the first explainable feature of the machine learning base model comprises the global-level importance magnitude value and the global-level importance direction label, and
wherein the global-level importance direction label has been identified as erroneous.

25. The computer program product of claim 24, wherein the program instructions are further executable by the at least one processor to cause the at least one processor to use a data perturbation process to generate the pair of baseline predictions by the machine learning base model and to determine the local-level importance of the first explainable feature of the machine learning base model to the prediction class of the machine learning base model.

* * * * *